United States Patent
Baughman

(10) Patent No.: US 8,614,563 B2
(45) Date of Patent: Dec. 24, 2013

(54) BATTERY CELL STATE OF CHARGE BALANCING

(75) Inventor: Andrew C. Baughman, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 233 days.

(21) Appl. No.: 13/083,389

(22) Filed: Apr. 8, 2011

(65) Prior Publication Data

US 2012/0256592 A1 Oct. 11, 2012

(51) Int. Cl.
*H01M 10/44* (2006.01)
*H01M 10/46* (2006.01)

(52) U.S. Cl.
USPC .......................................................... 320/118

(58) Field of Classification Search
USPC ........................... 320/118, 107, 128, 132, 149
See application file for complete search history.

(56) References Cited

U.S. PATENT DOCUMENTS

| | | | |
|---|---|---|---|
| 4,958,127 A | 9/1990 | Williams et al. | |
| 7,378,818 B2* | 5/2008 | Fowler et al. | 320/119 |
| 8,041,522 B2* | 10/2011 | Plett | 702/63 |
| 8,143,852 B2* | 3/2012 | Murao | 320/118 |
| 8,350,528 B2* | 1/2013 | Yang et al. | 320/118 |
| 2009/0085520 A1* | 4/2009 | Murao | 320/134 |
| 2010/0194339 A1* | 8/2010 | Yang et al. | 320/116 |
| 2011/0130985 A1* | 6/2011 | Plett | 702/63 |

OTHER PUBLICATIONS

German Office Action, dated Nov. 20, 2012, issued in German Patent Application No. 10 2012 203 991.0.

* cited by examiner

*Primary Examiner* — Edward Tso
(74) *Attorney, Agent, or Firm* — Ingrassia Fisher & Lorenz, P.C.

(57) ABSTRACT

Methods and systems for balancing a state of charge of cell units of a battery pack of a vehicle are provided. Voltage sensors each measure a first value of state of charge of respective cell units at a first time, and a second value of state of charge of the respective cell units at a second time that is subsequent to the first time. A current sensor measures a current of the battery pack. A controller is coupled to the voltage sensors and the current sensor. The controller balances the state of charge around a predetermined calibrated value using the first values of state of charge, the second values of state of charge, and the current.

20 Claims, 2 Drawing Sheets

BATTERY CELL STATE OF CHARGE BALANCING

TECHNICAL FIELD

The present disclosure generally relates to the field of vehicle batteries and, more specifically, to methods and systems for balancing cell state of charge in battery packs, such as in electric or hybrid electric vehicles.

BACKGROUND

Certain vehicles, particularly electric vehicles and hybrid electric vehicles, utilize battery packs for power. The battery pack includes various battery cells within. As the battery packs are used and the cells age, the cells may need to be balanced with respect to their states of charge. However, current techniques may not provide optimal cell balancing in certain situations, for example in which some but not all of the cells have been replaced, or in which certain cells have been replaced at different times as other cells within the battery pack.

Accordingly, it is desirable to provide improved methods for balancing state of charge of cells of a battery pack. It is also desirable to provide improved program products and systems for balancing state of charge of cells of a battery pack. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for balancing a state of charge of a plurality of cell units of a battery pack of a vehicle is provided. The method comprises the steps of determining a first value of state of charge for each of the plurality of cell units at a first time, determining a second value of state of charge at a second time that is subsequent to the first time, determining a current of the battery pack between the first time and the second time, and balancing the state of charge around a predetermined calibrated value using the first values of state of charge, the second values of state of charge, and the current.

In accordance with another exemplary embodiment, a program product for balancing a state of charge of a plurality of cell units of a battery pack of a vehicle is provided. The program product comprises a program and a non-transitory computer readable storage medium. The program is configured to at least facilitate determining a first value of state of charge for each of the plurality of cell units at a first time, determining a second value of state of charge at a second time that is subsequent to the first time, determining a current of the battery pack between the first time and the second time, and balancing the state of charge around a predetermined calibrated value using the first values of state of charge, the second values of state of charge, and the current. The non-transitory computer readable storage medium stores the program.

In accordance with a further exemplary embodiment, a system for balancing a state of charge of a plurality of cell units of a battery pack of a vehicle. The system comprises a plurality of voltage sensors, a current sensor, and a controller. Each of the plurality of voltage sensors is configured to measure a first state of charge value for a respective one of the plurality of cell units at a first time, and a second state of charge value for the respective one f the plurality of cell units at a second time that is subsequent to the first time. The current sensor is configured to measure a current of the battery pack. The controller is coupled to the plurality of voltage sensors and the current sensor. The controller is configured to balance the state of charge around a predetermined calibrated value using the first values of state of charge, the second values of state of charge, and the current.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
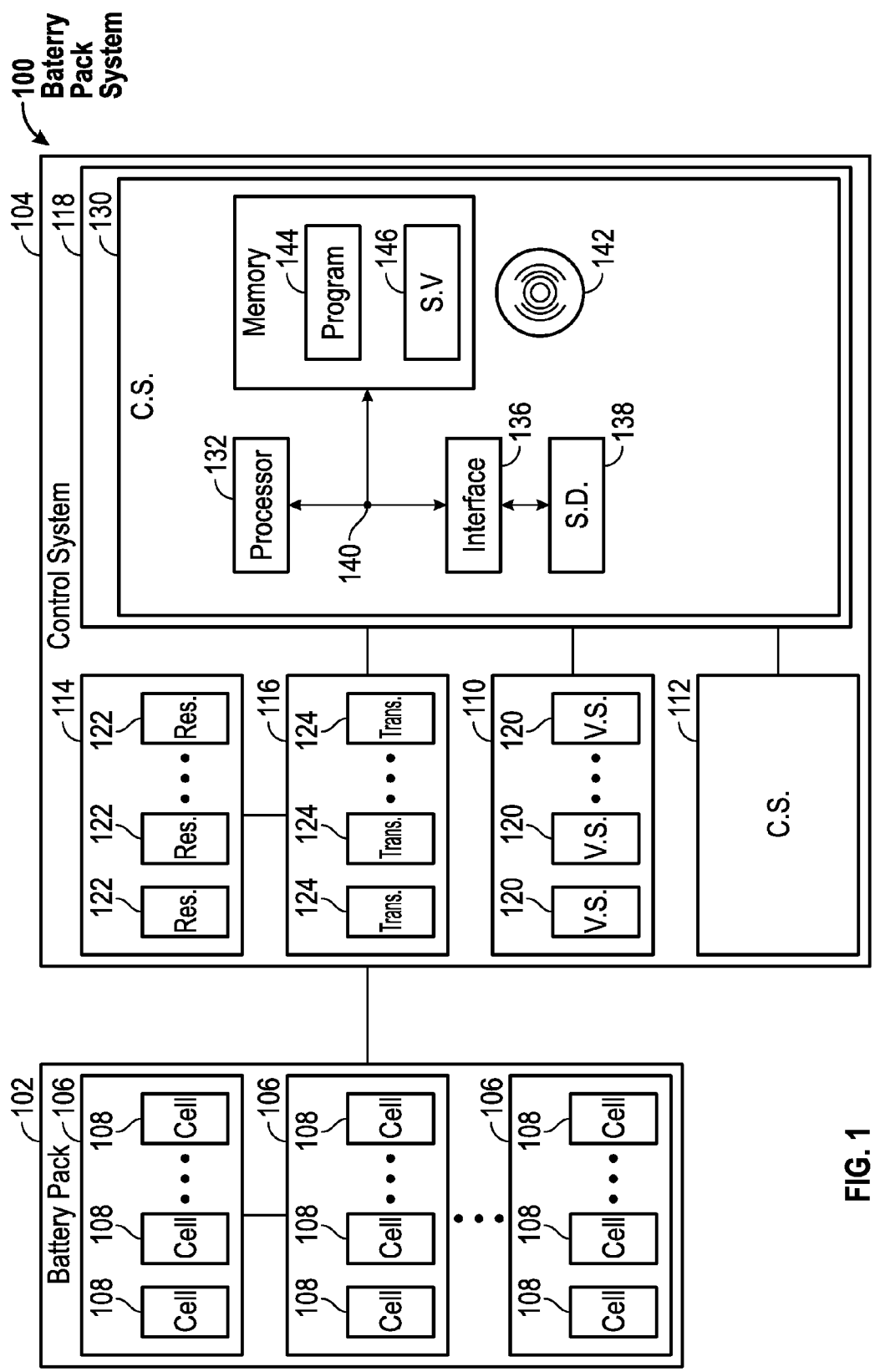
FIG. 1 is a functional block diagram of a battery pack system including a battery pack and a controller, for implementation in a vehicle, such as an electric vehicle or a hybrid electric vehicle.

FIG. 1 is a functional block diagram of a battery pack system 100 for a vehicle. In one exemplary embodiment, the battery pack system 100 is used for an electric vehicle, such as an electric automobile. In another exemplary embodiment, the battery pack system 100 is used for a hybrid electric vehicle, such as a hybrid electric automobile.

As depicted in FIG. 1, the battery pack system 100 includes a battery pack 102 and a control system 104. The battery pack 102 includes various cell units 106. Each cell unit 106 includes one or more battery pack cells (also referred to herein as battery cells or cells) 108. Specifically, each cell unit 106 comprises an individually balanceable unit, in which the one or more battery cells 108 thereof are balanced together.

In one example, each cell unit 106 comprises a single battery cell 108. In another example, each cell unit 106 comprises two battery cells 108. In yet another example, each cell unit 106 comprises three battery cells 108. In further examples, each cell unit 106 comprises four or more battery cells 108. In examples in which a cell unit 106 comprises multiple battery cells 108, such multiple battery cells 108 of a cell unit 106 are physically tied together in parallel, and the cell voltage of the multiple battery cells 108 of the cell unit 106 cannot differ from one another unless the battery cells 108 are broken apart from one another.

The control system 104 is coupled to the battery pack 102. The control system 104 balances a state of charge of the cell units 106 of the battery pack 102 using multiple measured state of charge values for each cell unit 106, a measured current of the battery pack 102, measured continuously between the different points in time, and using a predetermined calibrated value of state of charge. The control system 104 balances the state of charge of the cell units 106 using steps of the process 200 described further below in connection with FIG. 2, in accordance with an exemplary embodiment.

As depicted in FIG. 1, the control system 104 includes a voltage sensor unit 110, a current sensor 112, a resistor unit 114, a transistor unit 116, and a controller 118. The voltage sensor unit 110 includes voltage sensors 120. Preferably, the voltage sensor unit 110 includes a separate voltage sensor 120 for each of the cell units 106 of the battery pack 102. Each voltage sensor 120 corresponds to a different respective one of the cell units 106, and is configured to measure a voltage of the respective cell unit 106 at different points in time. The voltage sensor unit 110 provides the voltage measurements to the controller 118 for processing and for balancing the state of charge of the cell units 106 in accordance with the steps of the process 200 described further below in connection with FIG. 2.

The current sensor 112 is configured to be coupled to the battery pack 102. The current sensor 112 measures a current of the battery pack 102. The current sensor 112 provides the current measurements to the controller 118 for processing and for balancing the state of charge of the cell units 106 in accordance with the steps of the process 200 described further below in connection with FIG. 2. In certain embodiments, multiple current sensors 112 may be used.

The resistor unit 114 includes resistors 122. Preferably, the resistor unit 114 includes a separate resistor 122 for each of the cell units 106 of the battery pack 102. Each resistor 122 is configured to be coupled to a different respective one of the cell units 106. Each resistor 122 causes an adjustment in the state of charge for the respective one of the cell units 106 via a discharge, to thereby balance the cell units 106.

The transistor unit 116 includes transistors 124. Preferably, the transistor unit 116 includes a separate transistor 124 for each of the cell units 106 of the battery pack 102. Alternatively stated, the transistor unit 116 includes a separate transistor 124 for each of the resistors 122 of the resistor unit 114. Each transistor 124 is configured to be coupled to a different respective one of the resistors 122. Each transistor 124 is configured to turn a respective one of the resistors 122 on and off based on instructions provided by the controller 118, to thereby balance the cell units 106.

The controller 118 is coupled to the voltage sensor unit 110, the current sensor 112, and the transistor unit 116. The controller 118 receives the voltage values from the voltage sensor unit 110 and the current sensor 112. The controller 118 processes these values and utilizes them to balance the state of charge of the cell units 106 of the battery pack 102 around a predetermined calibrated state of charge value. The controller 118 accomplishes the state of charge adjustments via instructions provided to the transistor unit 116 to activate and deactivate the various resistors 122 for calculated amounts of time, to thereby adjust the state of charge of the cell units 106 around the predetermined state of charge value based on the voltage, current, and/or other values processed by the controller 118.

As depicted in FIG. 1, the controller 118 comprises a computer system 130. In certain embodiments, the controller 118 may also include one or more of the sensors 112, 120, resistors 122, transistors 124, and/or one or more other devices. In addition, it will be appreciated that the controller 118 may otherwise differ from the embodiment depicted in FIG. 1, for example in that the controller 118 may be coupled to or may otherwise utilize one or more remote computer systems and/or other control systems.

In the depicted embodiment, the computer system 130 is coupled to each of the sensors 120. The computer system 130 performs the functions of the controller 118, for example in receiving signals or information from the voltage sensor unit 110 and the current sensor 112, processing these signals or information, and balancing the cell units 106 via corresponding instructions provided to the transistor unit 116. In a preferred embodiment, these and other functions are conducted in accordance with steps of the process 200 and the various steps, sub-processes, and graphical illustrations pertaining thereto in FIG. 2, described further below.

In the depicted embodiment, the computer system 130 includes a processor 132, a memory 134, an interface 136, a storage device 138, and a bus 140. The processor 132 performs the computation and control functions of the computer system 130 and the controller 118, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 144 contained within the memory 134 and, as such, controls the general operation of the controller 118 and the computer system 130, preferably in executing the steps of the processes described herein, such as the steps of the process 200 and the various steps, sub-processes, and graphical illustrations pertaining thereto in FIG. 2, described further below.

The memory 134 can be any type of suitable memory. This would include the various types of dynamic random access memory (DRAM) such as SDRAM, the various types of static RAM (SRAM), and the various types of non-volatile memory (PROM, EPROM, and flash). The bus 140 serves to transmit programs, data, status and other information or signals between the various components of the computer system 130. In a preferred embodiment, the memory 134 stores the above-referenced program 144 along with one or more stored values 146, including the above-referenced predetermined calibrated state of charge value for balancing the cell units 106 of the battery pack 102. In certain examples, the memory 134 is located on and/or co-located on the same computer chip as the processor 132.

The interface 136 allows communication to the computer system 130, for example from a system driver and/or another computer system, and can be implemented using any suitable method and apparatus. It can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 144 that executes one or more embodiments of one or more processes of the present disclosure, such as the process 200 and the various steps, sub-processes, and graphical illustrations pertaining thereto in FIG. 2, described further below. In another exemplary, embodiment, the program product may be directly stored in and/or otherwise accessed by the memory 134 and/or a disk (e.g. disk 142), such as that referenced below.

The bus 140 can be any suitable physical or logical means of connecting computer systems and components. This includes, but is not limited to, direct hard-wired connections, fiber optics, infrared and wireless bus technologies. During operation, the program 144 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 130 may also otherwise differ from the embodiment depicted in FIG. 1, for example in that the computer system 130 may be coupled to or may otherwise utilize one or more remote computer systems and/or other control systems.

Figure 2:
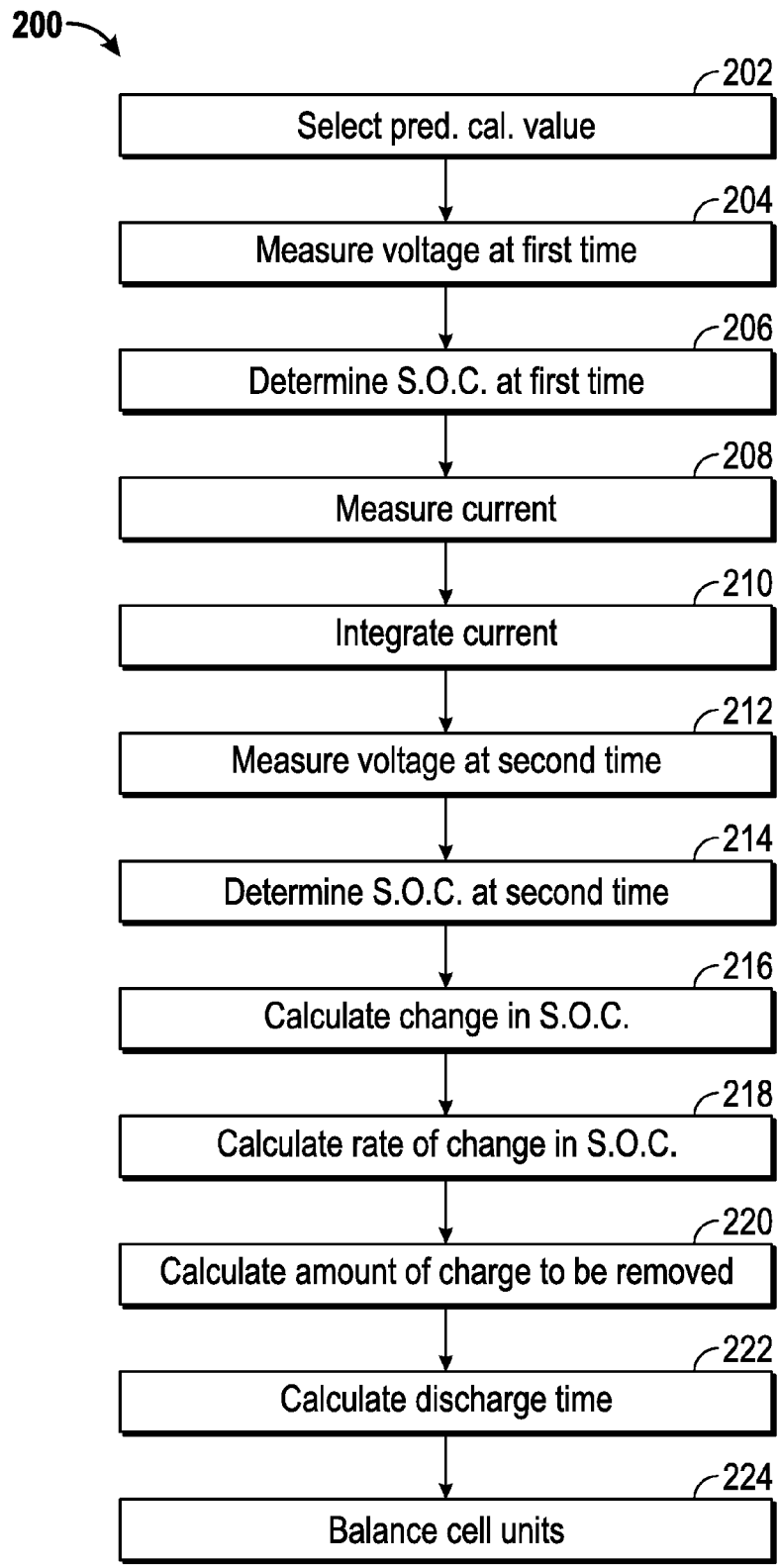
FIG. 2 is a flowchart of a process for balancing a state of charge of cell units of a battery pack of a vehicle, and that can be used in connection with the battery pack system of FIG. 1, in accordance with an exemplary embodiment.

FIG. 2 is a flowchart of a process 200 for balancing a state of charge of cell units of a battery pack of a vehicle, in accordance with an exemplary embodiment. The process 200 can be utilized in connection with the battery pack system 100 of FIG. 1 in accordance with an exemplary embodiment.

As depicted in FIG. 2, the process 200 includes the step of selecting a predetermined calibrated value for a state of charge of the battery pack (step 202). The predetermined calibrated value is selected offline, and is preferably selected prior to the operation of the battery pack. The predetermined calibrated value is a fixed value of the state of charge that is used for balancing the cell units, and is independent of any measured states of charge of the cell units during the process 200.

The predetermined calibrated value is preferably stored in the memory 134 of FIG. 1 as a stored value 146 thereof for subsequent retrieval and use by the processor 132 of FIG. 1 in balancing the cell units 106 of the battery pack 102 of FIG. 1. The calibrated value may be selected, in advance, based upon factors that may include, by way of example, the type of battery pack, the type of vehicle in which the battery pack is utilized, a usage window for the battery pack, and a cell chemistry pertaining thereto.

In certain examples, the predetermined calibrated value may be approximately fifty percent (50%) of a state of charge capacity for the cell units, in order to represent a midpoint for the operating window, and to minimize overall deviation in the state of charge. In other examples, other values may be utilized. For example, if deviations in an upper range of state of charge values for a particular battery pack and/or vehicle are more easily controlled than deviations in a lower range of state of charge values, then the predetermined calibrated value may be significantly less than fifty percent (50%). Conversely, if deviations in a lower range of state of charge values for a particular battery pack and/or vehicle are more easily controlled than deviations in an upper range of state of charge values, then the predetermined calibrated value may be significantly greater than fifty percent (50%).

A voltage is measured for the cell units at a first time (step 204). In a preferred embodiment, a voltage is measured for each of the cell units 106 of FIG. 1 at a first point in time. The voltages are preferably measured by the voltage sensors 120 of FIG. 1 with respect to their respective cell units 106, and the voltage values are provided by the voltage sensor unit 110 of FIG. 1 to the processor 132 of FIG. 1 for processing. In one embodiment, the first time represents a point in time or time period when the battery pack 102 of FIG. 1 is first activated or woken up during an ignition cycle of the vehicle.

A state of charge is determined for the cell units at the first time (step 206). The state of charge is preferably determined for each of the cell units 106 of FIG. 1 by the processor 132 of FIG. 1 using the voltages from step 204 for the first time referenced above in step 204. In one embodiment (for example, for use with cell chemistries without voltage hysteresis), the state of charge for the various cell units can be ascertained via a two-dimensional look-up table comparing voltage with temperature after the battery is left alone (without charging, discharging) for a sufficient amount of time. In another embodiment (for example, for use with cell chemistries that exhibit voltage hysteresis), a recent history of the battery must be taken into account, and complex battery state estimators (BSEs) may be used to monitor important parameters and produce state of charge and other important information pertaining to the batteries.

In addition, a current is measured for the battery pack (step 208). In a preferred embodiment, a current for the battery pack 102 of FIG. 1 is measured by the current sensor 112 of FIG. 1 at the first time referenced above in connection with steps 204 and 206, the second time referenced below in connection with step 212, and/or one or more points in time in-between. The current values are provided by the current sensor 112 of FIG. 1 to the processor 132 of FIG. 1 for processing. In one embodiment, the current is measured for the battery pack continuously between the first and second times. In a preferred embodiment, the current measurements of step 208 proceed in a continuous manner between the first time referenced above in connection with steps 204 and 206 and the second time referenced below in connection with step 212, and the current values are continuously provided by the current sensor 112 of FIG. 1 to the processor 132 of FIG. 1 for processing.

The current of the battery pack is integrated across time periods (step 210). Specifically, the measured currents of step 208 are integrated between the first time of steps 204 and 206 and the second time of step 212. The processor 132 preferably integrates the current values between the first time and the second time for use in balancing the cell units of the battery pack.

A voltage is also measured for the cell units at a second time (step 212). In a preferred embodiment, a voltage is measured for each of the cell units 106 of FIG. 1 at a second point in time. The voltages are preferably measured by the voltage sensors 120 of FIG. 1 with respect to their respective cell units 106, and the voltage values are provided by the voltage sensor unit 110 of FIG. 1 to the processor 132 of FIG. 1 for processing.

The second time (as referenced in step 212 and also as referenced above in connection with steps 208 and 210) is subsequent to the first time referenced above in connection with steps 204 and 206. In one embodiment, the second time represents a point in time or time period when the battery pack 102 of FIG. 1 is first activated or woken up during a subsequent ignition cycle of the vehicle following the ignition cycle of the first time of steps 204 and 206. In another embodiment, the second time represents a point in time or time period in the same ignition cycle as the first time of steps 204 and 206, but at a subsequent time during the ignition cycle.

A state of charge is determined for the cell units at the second time (step 214). The state of charge is preferably determined for each of the cell units 106 of FIG. 1 by the processor 132 of FIG. 1 using the voltages from step 212 for the second time. The calculation is similar to that performed during step 206 above, but for a subsequent time period.

In certain embodiments, a determination may also made as to whether the state of charge of the cell units at the second time is at least equal to a required predetermined percentage difference from the state of charge of the respective cell units at the first time. In one example, the predetermined percentage is equal to an average of ten percent (10%) difference or greater among the various cell units. In one such example, if the state of charge at the second time is not at least ten percent (10%) different than the state of charge of the same or corresponding cell unit at the first time, then the process must wait longer and re-select the second time to be some other time in the future in which the state of charge has increased or decreased at least ten percent (10%) from the first time period referenced above to the new selected time period. The voltages of step 212 would then be re-measured, and the states of charge of step 214 re-calculated, at such a new point in time in which the above criteria are satisfied. This new point in time would then be considered to be the second time for the purposes of the process 200. The process 200 then continues, beginning with step 216, described directly below. As mentioned, above, the predetermined percent difference required may vary in different embodiments.

A change in state of charge is also calculated for each cell unit that would align the state of charge of the cell unit with the predetermined calibrated value (step 216). Specifically, in certain embodiments, for each cell unit, a difference between the state of charge at the second time (or some other current time) of step 214 and the predetermined calibrated value of step 202 is calculated. This state of charge difference is preferably calculated for each of the cell units 106 of FIG. 1 by the processor 132 of FIG. 1 utilizing the state of charge of step 214 and the predetermined calibrated value retrieved from the stored value 146 of the memory 134 of FIG. 1.

In addition, a rate of change of the state of charge is calculated (step 218). Specifically, the rate of change, or slope, is calculated between the state of charge of step 206 and the state of charge of step 214 between the first period and the second period thereof. The rate of change of the state of charge is preferably calculated for each of the cell units 106 of FIG. 1 by the processor 132 of FIG. 1 by subtracting the state of charge of step 206 from the state of charge of step 214 and dividing the resulting difference by the integrated current of step 210.

A calculation is then performed as to an amount of electrical charge (such as a required number of Amp-hours) that needs to be removed from each cell to meet the state of charge target (step 220). In one embodiment, the amount of Amp-hours needed to be removed from each cell is calculated using the following equation:

$$\Delta A_h r_n = \frac{SOC_{n_s} - SOCtarget}{m_n} - \min_{for\,any_n}\left(\frac{SOC_{n_2} - SOCtarget}{m_n}\right)$$

in which $\Delta Ahr_n$ represents the required number of Amp-hours, n represents a particular individual cell unit, $SOCn2$ represents the state of charge of the cell unit at the second point in time, SOCtarget represents the target state of charge for the cell unit, m represents the slope, or change, in the state of charge of the cell unit versus the integrated Amp-Hours between the two state of charge collection points (namely, between the first and second time periods referenced above), and min represents the minimum value of the equation in parentheses across all of the cell units. In using this equation, it is the difference between the particular cell unit's Amp-Hours to dissipate to meet the state of charge target and the proposed baseline or minimum number of Amp-Hours for any cell unit to dissipate to meet the state of charge target.

In certain embodiments, a discharge time may be calculated for each cell unit (step 222). Specifically, for each cell unit, an amount of time is calculated that would result in a discharge of Amp-Hours from the cell unit equal to the calculated amount of step 220). The discharge time is preferably calculated for each cell unit 106 of FIG. 1 with respect to an amount of time by which the respective resistor 122 of the resistor unit 114 of FIG. 1 would need to be run or be activated by the respective transistor 124 of the transistor unit 116 of FIG. 1 to discharge the Amp-Hours of the respective cell unit 106 of FIG. 1, so that the dissipated Amp-Hours is equal to that calculated in step 220 above. The result of the removal of the Amp-Hours calculated in step 220 is that the state of charge of each of the cell units will be balanced at the target state of charge of step 202 when the average state of charge of the cell units is equal to the target state of charge. Accordingly, the state of charge will be balanced at the target state of charge (equal to the predetermined calibrated value of step 202).

The cell units are then balanced (step 224). In one embodiment, the processor 132 of FIG. 1 provides instructions to the transistors of 124 of FIG. 1 to activate or turn on their respective resistors 122 of FIG. 1 until the required number of units of electrical charge (such as Amp-hours) calculated in step 220 are dissipated. In one such embodiment, the instructions include an amount of time that the resistors 122 must run so as to remove the desired number of Amp-Hours. In either case, the resistors 122 then run until the Amp-Hours calculated in step 220 have been removed from each of the cell units 106 of FIG. 1 corresponding to each particular resistor 122.

Accordingly, the process 200 described above in connection with FIG. 2, along with the battery pack system 100 described above in connection with FIG. 1, provide for potentially improved balancing of cell units of a high voltage battery pack for a vehicle. The cell units are balanced with respect to a fixed, predetermined calibration point. This allows for the cell units to be efficiently balanced with respect to the fixed point, rather than requiring the battery pack to be continually re-balanced as with current techniques, particularly in situations in which a combination of old and new cells are used together in a battery pack.

It will be appreciated that the disclosed systems, methods, and program products may vary from those depicted in the Figures and described herein. For example, the battery pack system of (including the battery pack, the controller, and/or various components thereof) may vary from that depicted in FIG. 1 and described in connection therewith. In addition, it will be appreciated that certain steps of the process 200 may vary from those depicted in FIGS. 2-3 and/or described above in connection therewith. It will similarly be appreciated that certain steps of the process 200 may occur simultaneously or in a different order than that depicted in FIGS. 2-3 and/or described above in connection therewith. It will similarly be appreciated that the disclosed methods, systems, and program products may be implemented and/or utilized in connection with any number of different types of automobiles, sedans, sport utility vehicles, trucks, any of a number of other different types of vehicles. In addition, the disclosed systems, methods, and program products may also be utilized in connection with various other applications, such as stand-by power sources, for example for telecommunications or building back-up power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method for balancing a state of charge of a plurality of cell units of a battery pack of a vehicle, the method comprising the steps of:
    determining a first value of state of charge for each of the plurality of cell units at a first time;
    determining a second value of state of charge for each of the plurality of cell units at a second time that is subsequent to the first time;
    determining a current of the battery pack between the first time and the second time; and
    balancing the state of charge around a predetermined calibrated value using the first values of state of charge, the second values of state of charge, and the current via a processor.

2. The method of claim 1, wherein:
    the step of determining the first values of state of charge comprises the steps of:
        measuring a first voltage value for each of the plurality of cell units via a voltage sensor at the first time; and
        determining the first value of state of charge for each of the plurality of cell units using the first voltage values; and
    the step of determining the first values of state of charge comprises the steps of:
        measuring a second voltage value for each of the plurality of cell units via the voltage sensor at the second time; and
        determining the second value of state of charge for each of the plurality of cell units using the second voltage values.

3. The method of claim 2, wherein the step of determining the current comprises the step of:
    integrating the current of the battery pack continuously between the first time and the second time, generating an integrated current.

4. The method of claim 3, wherein the step of balancing the state of charge comprises the steps of:
    calculating an amount of electrical charge to be discharged for each of the plurality of cell units using the first value of state of charge, the second value of state of charge, and the integrated current of the battery pack; and
    running a resistor for each of the plurality of cell units until the amount of electrical charge is discharged, wherein the running of the resistor begins after the first time and the second time.

5. The method of claim 4, further comprising the steps of:
    calculating an amount of charge to be removed from each of the plurality of cell units to reach the predetermined calibrated value; and
    calculating a discharge time for each of the plurality of cell units using the amount of charge to be removed and a current state of charge of each of the plurality of cell units.

6. The method of claim 5, wherein the current state of charge for each cell unit comprises the second value of state of charge.

7. The method of claim 5, wherein the step of calculating the discharge time comprises the steps of:
    calculating a rate of change of amps per hour for each of the plurality of cell units; and
    calculating the discharge time using the rate of change of amps per hour via the processor.

8. The method of claim 1, wherein:
    the step of determining the first value of state of charge comprises determining the first value of state of charge for each of the plurality of cell units at the first time, the first time being prior to balancing of the state of charge; and
    the step of determining the second value of state of charge comprises determining the second value of state of charge for each of the plurality of cell units at the second time, the second time being subsequent to the first time but prior to balancing the state of charge.

9. A program product for balancing a state of charge of a plurality of cell units of a battery pack of a vehicle, the program product comprising:
    a program configured to at least facilitate:
        determining a first value of state of charge for each of the plurality of cell units continuously at a first time;
        determining a second value of state of charge for each of the plurality of cell units at a second time that is subsequent to the first time;
        determining a current of the battery pack between the first time and the second time; and
        balancing the state of charge around a predetermined calibrated value using the first values of state of charge, the second values of state of charge, and the current; and
    a non-transitory computer readable storage medium storing the program.

10. The program product of claim 9, wherein the program is further configured to at least facilitate:
    measuring a first voltage value for each of the plurality of cell units via a voltage sensor at the first time;
    measuring a second voltage value for each of the plurality of cell units via the voltage sensor at the second time;
    determining the first value of state of charge for each of the plurality of cell units using the first voltage values; and
    determining the second value of state of charge for each of the plurality of cell units using the second voltage values.

11. The program product of claim 9, wherein the program is further configured to at least facilitate:
    integrating the current continuously between the first time and the second time, generating integrated current.

12. The program product of claim 11, wherein the program is further configured to at least facilitate:
    calculating an amount of electrical charger to be discharged for each of the plurality of cell units using the first value of state of charge, the second value of state of charge, and the integrated current; and
    running a resistor for each of the plurality of cell units until the amount of electrical charge is discharged, wherein the running of the resistor begins after the first time and the second time.

13. The program product of claim 9, wherein the first time and the second time are both prior to balancing the state of charge.

14. A system for balancing a state of charge of a plurality of cell units of a battery pack of a vehicle, the system comprising:
    a plurality of voltage sensors, each of the plurality of voltage sensors configured to measure a first value of state of charge for each of the plurality of cell units at a first time and a second value of state of charge for each of the plurality of cell units at a second time that is subsequent to the first time; and a current sensor configured to measure a current of the battery pack; and a controller coupled to the plurality of voltage sensors and the current sensor and configured to balance the state of charge around a predetermined calibrated value using the first values of state of charge, the second values of state of charge, and the current between the first time and the second time.

15. The system of claim 14, wherein the controller is further configured to:

integrate the current between the first time and the second time, generating integrated current; and balance the state of charge around the predetermined calibrated value using the first values of state of charge, the second values of state of charge, and the integrated current.

16. The system of claim 15, further comprising:

a plurality of resistors, each of the plurality of resistors configured to be coupled to a respective one of the plurality of cell units;

wherein the controller is further configured to:

calculate an amount of electrical charge to be discharged for each of the plurality of cell units using the state of charge and the integrated current of the battery pack between the first time and the second time; and provide instructions for running the resistor for each of the plurality of cell units until the amount of electrical charge is discharged, wherein the running of the resistor begins after the first time and the second time.

17. The system of claim 16, further comprising:

a plurality of transistors, each of the plurality of transistors coupled to the controller and to a respective one of the plurality of resistors and configured to activate the respective one of the plurality of resistors based on the instructions provided by the controller.

18. The system of claim 17, wherein the controller is further configured to:

calculate an amount of charge to be removed from each of the plurality of cell units to reach the predetermined calibrated value; and calculate a discharge time for each of the plurality of cell units using the amount of charge to be removed and a current state of charge of each of the plurality of cell units.

19. The system of claim 14, wherein the controller comprises:

a processor; and a memory coupled to the controller and configured to store the predetermined calibrated value.

20. The system of claim 14, wherein the first time and the second time are both prior to balancing the state of charge.

* * * * *